United States Patent
Willis et al.

(10) Patent No.: US 6,573,941 B1
(45) Date of Patent: Jun. 3, 2003

(54) LOW BIT RATE COMPRESSION FORMAT CONVERSION FOR IMPROVED RESOLUTION

(75) Inventors: Donald Henry Willis, Indianapolis, IN (US); Shu Lin, Indianapolis, IN (US)

(73) Assignee: Thomson Licensing SA, Boulgone Cedex (FR)

( * ) Notice: Subject to any disclaimer, the term of this patent is extended or adjusted under 35 U.S.C. 154(b) by 0 days.

(21) Appl. No.: 10/127,743

(22) Filed: Apr. 22, 2002

(51) Int. Cl.[7] .................................................. H04N 7/01
(52) U.S. Cl. ......................... 348/448; 348/446; 348/459
(58) Field of Search ............................... 348/441, 446, 348/448, 459, 458, 443; H04N 7/01

(56) References Cited

U.S. PATENT DOCUMENTS

| | | |
|---|---|---|
| 5,724,070 A | 3/1998 | Denninghoff et al. |
| 5,751,859 A | 5/1998 | Howard |
| 5,790,197 A | 8/1998 | Canfield |
| 5,844,617 A * | 12/1998 | Faroudja et al. ............ 348/441 |
| 6,031,572 A | 2/2000 | Christopoulos |
| 6,084,912 A | 7/2000 | Reitmeier et al. |
| 6,160,850 A | 12/2000 | Chen et al. |
| 6,285,748 B1 | 9/2001 | Lewis |
| 6,310,915 B1 | 10/2001 | Wells et al. |
| 6,311,058 B1 | 10/2001 | Wecker et al. |
| 6,456,329 B1 * | 9/2002 | Tinker et al. ............... 348/448 |

* cited by examiner

Primary Examiner—Sherrie Hsia
(74) Attorney, Agent, or Firm—Joseph S. Tripoli; Harvey D. Fried; Joseph J. Kolodka

(57) ABSTRACT

A method for format conversion includes providing a first interlaced video signal including non-progressive video of a first resolution, downconverting fields of the first resolution to fields of a second resolution, and combining and interlacing the fields at a third resolution. The video signal is transmitted at the third resolution. The video signal of the third resolution is deinterlaced to form a progressive format video. The progressive format video is converted to the first non-progressive resolution by alternately adjusting position of the progressive format of the third resolution up and down to make upper and lower fields, respectively, of the first resolution for display.

23 Claims, 5 Drawing Sheets

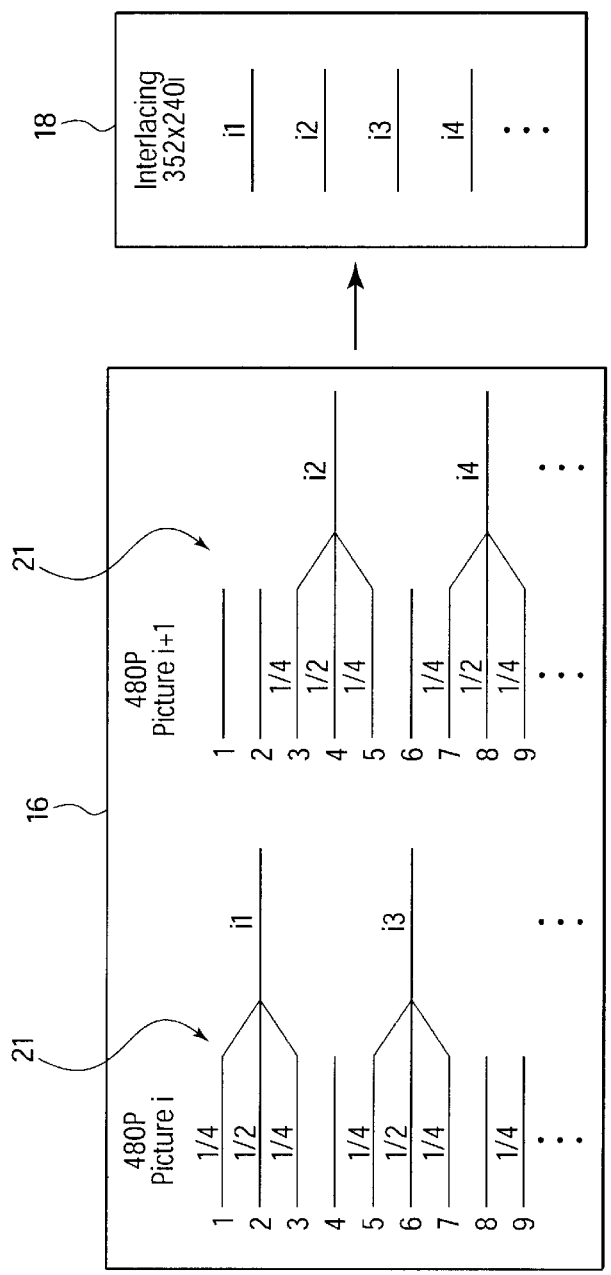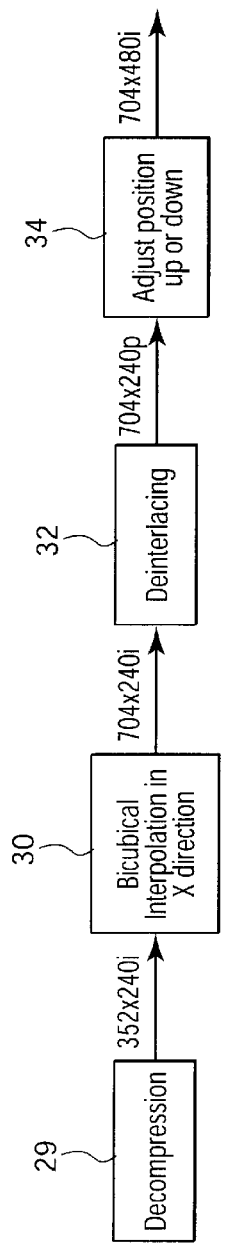
Fig. 3
Fig. 4

LOW BIT RATE COMPRESSION FORMAT CONVERSION FOR IMPROVED RESOLUTION

FIELD OF THE INVENTION

The present invention generally relates to low bit rate transmissions and, more particularly, to a method and apparatus for providing format conversion of video to enable low bit rate compression of non-progressive video.

BACKGROUND OF THE INVENTION

Video fields are sometimes interlaced to enable serial video bit streams to be sent over networks. Interlacing includes sending alternating fields of video successively over a link. Video streams may be identified as progressive or non-progressive. Progressive video includes pairs of successive fields where there is no object motion between pairs of successive fields. Non-progressive video can include fields where there is object motion between successive pairs of fields. Progressive frames can easily be format converted; however, format converting non-progressive video does not enjoy the same capability. Instead, non-progressive video is much more difficult to format convert without significant loss in vertical resolution.

One approach to this downconverting is to use intra-field interpolation to convert 240-line incoming fields to 120-line fields. The resulting 240 interlaced (240i) video is compressed, transmitted, and decompressed. The 240i video is then intra-field converted by vertical interpolation to 240-line fields of a 480i signal and displayed. The vertical resolution suffers, especially in comparison to 240 progressive picture processing. Diagonal edges of moving objects are jagged, as well.

Therefore, a need exists for a method and system, in which non-progressive video is downconverted to lower picture resolution for acceptable compression to low bit rate video. A further need exists for adequate picture quality after upconverting the transferred low bit rate video.

SUMMARY OF THE INVENTION

A method for format conversion includes providing a first interlaced video signal including non-progressive video of a first resolution, downconverting fields of the first resolution to fields of a second resolution, and combining and interlacing the fields at a third resolution. The video signal is transmitted at the third resolution. The video signal of the third resolution is deinterlaced to form a progressive format video. The progressive format video is converted to the first non-progressive resolution by alternately adjusting position of the progressive format of the third resolution up and down to make upper and lower fields, respectively, of the first resolution for display.

In other embodiments, the step of deinterlacing the non-progressive video signal to a progressive format having the first resolution may be included. A jagged diagonal reduction method may be employed to perform deinterlacing.

A system for format conversion includes a conversion device, which deinterlaces a non-progressive interlaced video signal having a first resolution to a progressive format having the same resolution. The conversion device downconverts the progressive format to a second resolution and combines and interlaces fields of the second resolution to provide frames at a third resolution. A transmission link is coupled to the conversion device for transmitting the video signal at the third resolution. A reconversion device is coupled to the output of the transmission link. The reconversion device deinterlaces the video stream of the third resolution as a progressive format video and converts the progressive format video to alternating upper field lines and lower field lines for display at the first resolution.

BRIEF DESCRIPTION OF THE DRAWINGS

The advantages, nature, and various additional features of the invention will appear more fully upon consideration of the illustrative embodiments now to be described in detail in connection with accompanying drawings wherein:

FIG. 3 is a block diagram showing blocks 16 and 18 in greater detail in accordance with one embodiment of the present invention;

FIG. 4 is a block diagram showing an illustrative post-processing sequence for format conversion in accordance with the present invention;

It should be understood that the drawings are for purposes of illustrating the concepts of the invention and are not necessarily the only possible configuration for illustrating the invention.

DETAILED DESCRIPTION OF THE INVENTION

The present invention provides a method and system for format converting a video to permit compression for a low bit rate stream. The present invention permits incoming non-progressive video to be deinterlaced and downconverted to fields to provide interlaced video with ½ resolution, for example, the vertical resolution. The ½ resolution interlaced video is compressed, transmitted, and decompressed. The ½ resolution interlaced video is then deinterlaced to a progressive format, and the progressive format video is converted to alternating upper fields and lower fields for display on conventional TV set or display monitor. Although the present invention is described in terms of a 2:1 resolution reduction, the vertical resolution reduction may be reduced by other ratios, for example, a 4:1 reduction.

It is to be understood that the present invention is described in terms of a conventional 480-line interlaced (480i) video system; however, the present invention is much broader and may include any video formats or sizes, which are capable of delivery over a wired or wireless network.

In one illustrative embodiment, incoming non-progressive 480i video is deinterlaced and downconverted to 120-line fields to make 240i video. The 240i video is compressed, transmitted, and decompressed. The 240i video is then deinterlaced to 240p. The 240p is converted to alternating 240-line upper field and 240-line lower field to make 480i for display on, for example, a conventional TV set. In addition, the present invention is applicable to any system including video delivery systems over the telephone, set top boxes, computer, satellite links, Internet, etc. The present invention is particularly useful in video on-demand applications, which may be implemented on a digital subscriber line (DSL) network or other systems with medium bit rate channels.

It should be understood that the elements shown in the FIGS. may be implemented in various forms of hardware, software or combinations thereof. Preferably, these elements are implemented in software on one or more appropriately programmed general-purpose devices, which may include a processor, memory and input/output interfaces.

Figure 1:
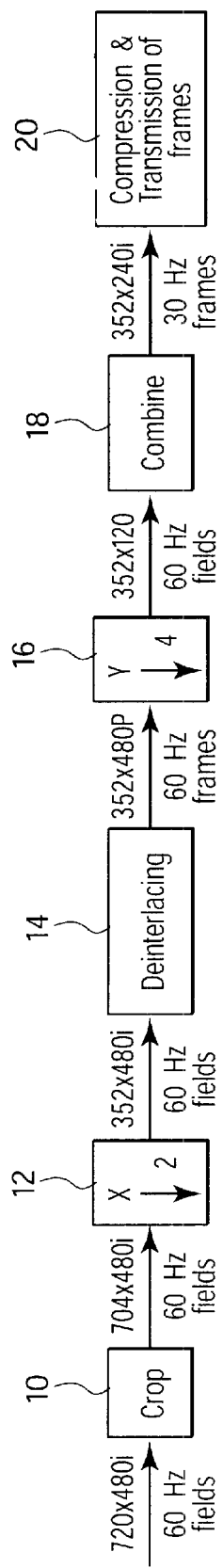
FIG. 1 is block diagram showing an illustrative preprocessing sequence for format conversion in accordance with the present invention.

Referring now in specific detail to the drawings in which like reference numerals identify similar or identical elements throughout the several views, and initially to FIG. 1, a flow/block diagram shows a method/system for preprocessing video in accordance with one embodiment of the present invention. In block 10, an incoming signal may be horizontally cropped to reduce processing. In an illustrative example, a 720 pixel (horizontal) by 480 interlaced (480i) pixel signal may be cropped to 704×480i, if needed. In block 12, a horizontal downsampling is performed to form 352× 480i. In the present example, a 2 to 1 downsampling is carried out. Other ratios are also contemplated. The downsampling may be performed using conventional interpolation filtering methods.

Figure 2:
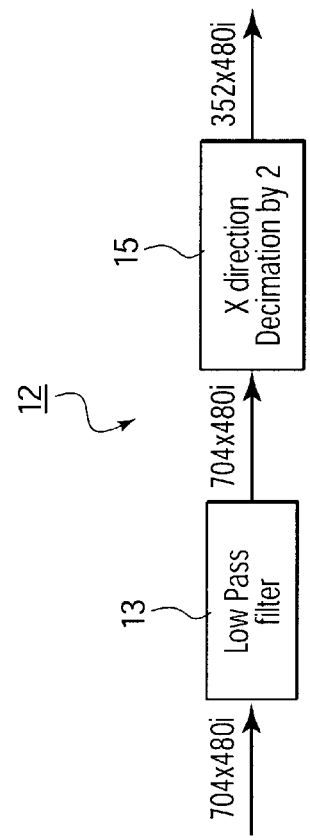
FIG. 2 is a block diagram showing block 12 in greater detail in accordance with one embodiment of the present invention.

Referring to FIG. 2 with continued reference to FIG. 1, block 12 is described in greater detail. A low pass anti-alias filter 13 filters the video data followed by a subsampling step in block 15. The output of block 15 is a ½ horizontally downsampled field.

Referring again to FIG. 1, the signal is deinterlaced to 352×480p to preferably 60 Hz in block 14. Deinterlacing may be performed by conventional deinterlacing methods. In block 16, the signal is vertically lowpass filtered as shown in FIG. 3, with a ¼, ½, ¼ filter 21, and subsequently is subsampled 4 to 1 with a first phasing to make an upper 120-line field, shown as lines numbered i1, i3, etc. Other filters may be employed for filter 21. Also shown in FIG. 3, a subsequent deinterlaced 480p frame, which is processed through the same filter as frame i, but is 4 to 1 subsampled with a different phase than the first phase to make a subsequent lower 120-line field, is shown as lines numbered i2, i4, etc. In this way, the 240i sequence of 60 Hz fields is formed. Pairs of successive 240i fields are then formed into 30 Hz frames in block 18.

Each frame is formed in block 18 shown in FIG. 1. In the illustrative example, 704×480i frames have been downconverted to 352×240i frames suitable for a reduced bit rate compression. In block 20, the video stream is compressed and transferred over a network or transmission link (wired or wireless) to a receiver such as a television or display device. Advantageously, the present invention improves the displayed vertical resolution for non-moving images. Non-moving images experience a vertical resolution improvement of 2:1 or greater over conventional systems. In addition, by employing the method of the present invention, including for example, jagged diagonal reduction, as will be described below, improved downconverting of non-progressive video streams is provided.

Figure 5:
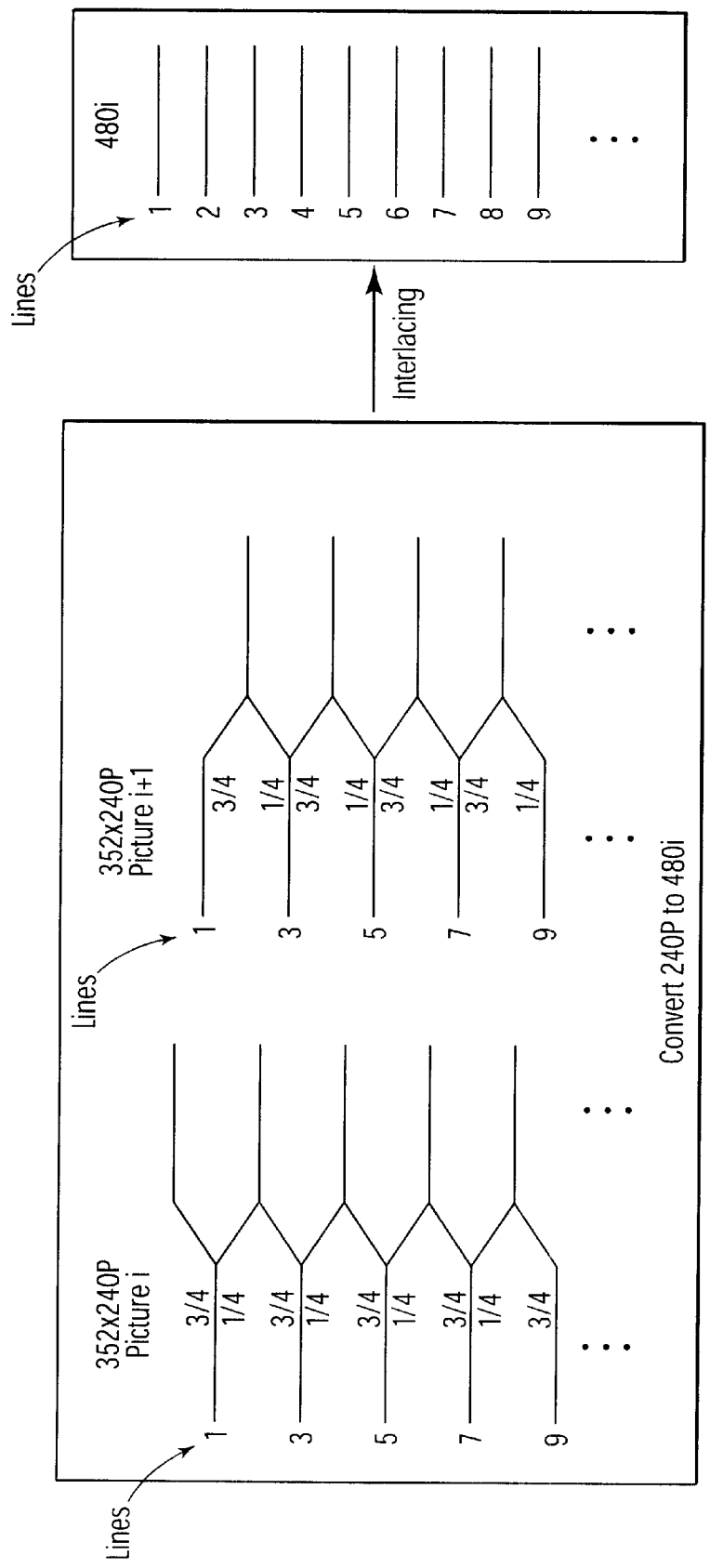
FIG. 5 is a diagram illustratively showing adjustment of line positions in step 34 in accordance with the present invention.

Referring to FIG. 4, after transfer of the video, the video is decompressed in block 29. Postprocessing includes upconverting each frame in the horizontal direction. This is illustratively shown in block 30 where an interpolation method, such as a bicubical interpolation method, is employed to upconvert 352 samples per line to 704 samples per line. The upconverted 240i signal is deinterlaced in block 32. One of a plurality of different deinterlacing algorithms may be employed. In one embodiment, a jagged diagonal reduction algorithm is employed for the moving portions of the picture. This will be described later with reference to FIG. 5. In block 34, the deinterlaced 240p/60 Hz signal is then converted into 240-line fields by alternating upward shift to make an upper 240-line field from a 240p frame and a downward shift to make a lower 240-line field from a succeeding 240p line frame. These shifts are performed in block 34 to adjust position up or down to reconstruct 480i fields. FIG. 5 is an illustrative diagram showing the conversion of 240p to 480i. The number associated with each line, e.g., ¼ and ¾, is a weight. A first picture i is shifted up by a quarter line, and a second picture i+1 is shifted down by a quarter line. These two shifted pictures are interlaced to form a 480 line interlaced picture. Following the adjusting of position, the signal can be outputted as a 60 Hz field sequence, which is restored to the 704×480i format.

Figure 6:
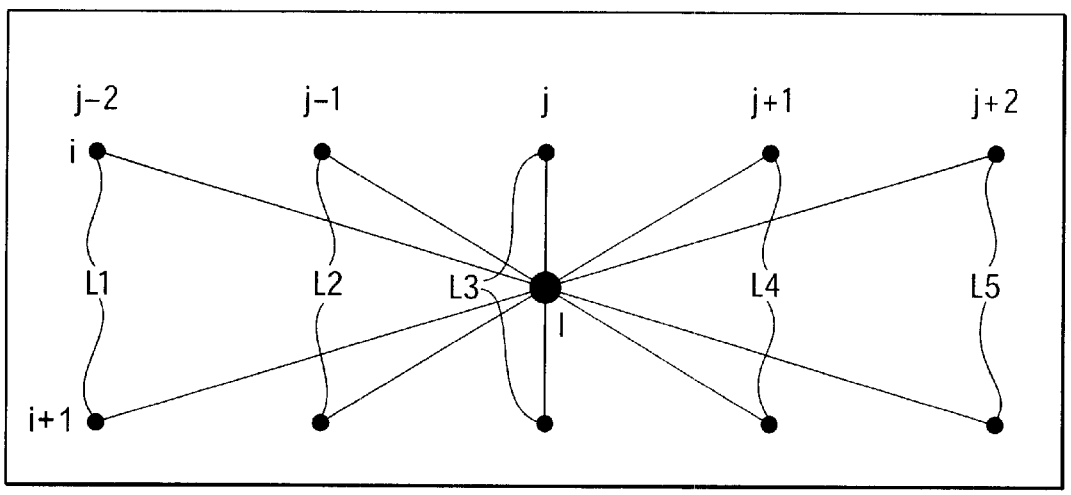
FIG. 6 is a diagram illustratively showing a jagged diagonal reduction method/algorithm employed in accordance with the present invention.

Referring to FIG. 6, an illustrative technique for deinterlacing is shown. In the illustrative example, a jagged diagonal reduction portion of the deinterlacing is performed. Other deinterlacing techniques may be employed and are contemplated by the present inventors. When motion is not present, the previous field lines may be inserted between the present field lines to accomplish deinterlacing. This maintains the full level of vertical detail. When an object is moving, the previous or following field cannot be used to make an in-between line of pixels. So these pixels must be formed from the lines immediately above and below the pixels to be formed.

Conventional practice is to use a simple vertical interpolation to do this. This would be done by forming pixel I by taking by taking the average, L3, of pixels directly above and below the I pixel. However, this is known to produce jagged diagonal edges.

In a jagged diagonal reduction method, preferably employed with the present invention, the diagonal pixel pairs L1 through L5 are tested to see which has the lowest difference, for example, in intensity. The pair with the lowest difference is averaged and used as pixel I. The exception to this occurs if this average is not the median of the average, the above pixel and the below pixel. If not, then the above pixel or the below pixel with the value nearest to this average is used instead. By employing this method, jagged edges are reduced significantly, rendering a better image on moving objects when the video is displayed.

Figure 7:
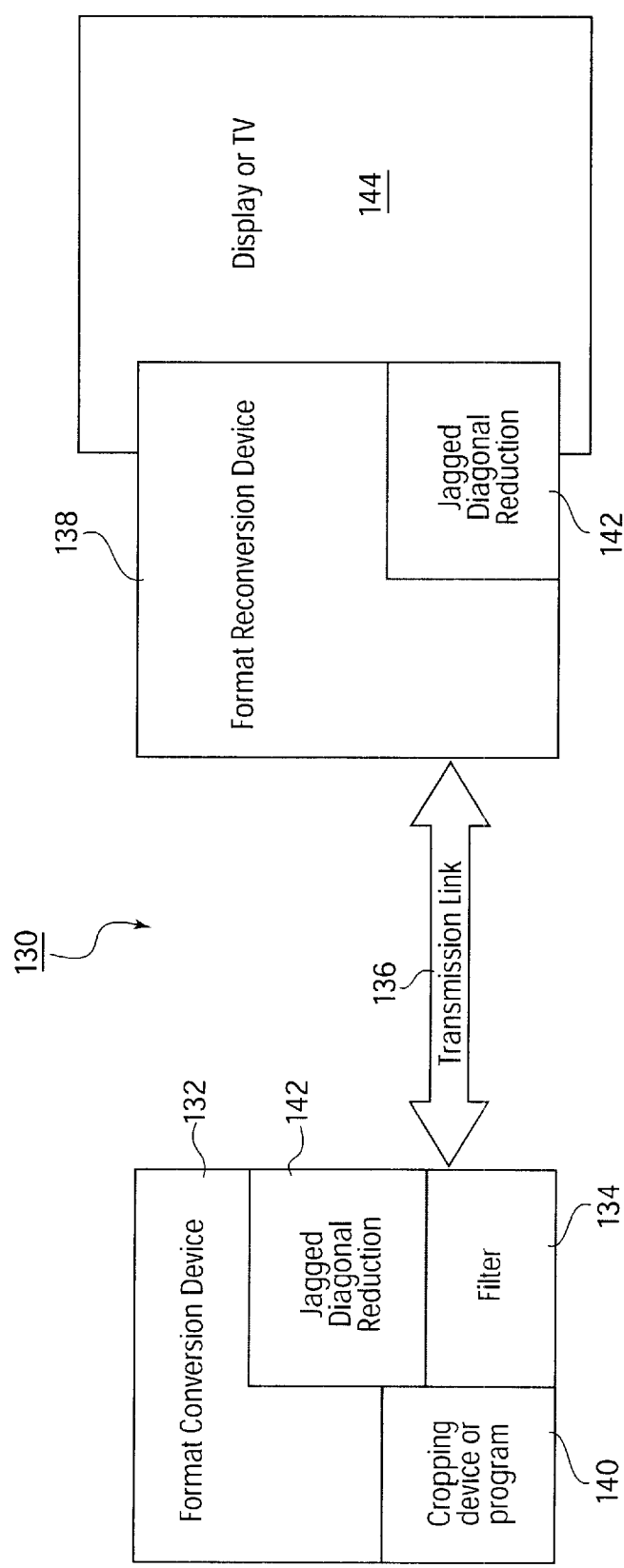
FIG. 7 is a diagram of an illustrative format conversion system in accordance with the present invention.

Referring to FIG. 7, a system 130 for format conversion is schematically shown in accordance with the present invention. System 130 provides a conversion device 132, which deinterlaces a non-progressive interlaced video stream having a first resolution (e.g., 480i) to a progressive format (e.g., 480p) having the same resolution. The conversion device 132 downconverts the progressive format to a second resolution (e.g., 120) and combines fields of the second resolution to provide frames at a third resolution (240i). The conversion device 132 preferably includes a ¼, ½, ¼ filter 134 which downconverts the progressive format (480p) of the first resolution. The filter 134 samples a first image i with a first phase and samples a second image i+1 using the same ¼, ½, ¼ filter 134 with a second phase. The fields are output from the ¼, ½, ¼ filter with the first phase and the second phase and a combining device combines the fields with the first phase with the fields of the second phase to achieve the third resolution. A jagged diagonal reduction algorithm 142 may be employed to provide deinterlacing of video signals. Conversion device 132 also preferably compresses the video data prior to transmission. Conversion device 132 is described with reference to blocks 10–18 in FIG. 1.

A transmission link 136 is coupled to the conversion device for transmitting the compressed video stream at the third resolution (e.g., 240).

A reconversion device 138 is coupled to the transmission link 136 and receives the transmitted video stream. The reconversion device 138 decompresses the video data when received. Reconversion device 138 deinterlaces the decompressed video stream of the third resolution to a progressive format video and converts the progressive format video to alternating upper field lines and lower field lines to make successive fields for display. Reconversion device 138 is described with reference to blocks 30–34 of FIG. 4.

System 130 may include a cropping module/device 140 for cropping out a portion of the non-progressive interlaced video stream to reduce an amount of pixels being processed. Reconversion device 138 may include a jagged diagonal reduction algorithm or other program/device 142 for deinterlacing the video stream. The video is then able to be displayed on, for example, a display or TV set 144. Compression and decompression may be performed in accordance with known methods.

Having described preferred embodiments for format conversion for low bit rate compression (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by letters patent is set forth in the appended claims.

What is claimed is:

1. A method for format conversion, comprising the steps of:
   providing a first interlaced video signal including non-progressive video of a first resolution;
   downconverting fields of the first resolution to fields of a second resolution;
   combining and interlacing the fields at a third resolution;
   transmitting the video signal at the third resolution;
   deinterlacing the video signal of the third resolution to form a progressive format video; and
   converting the progressive format video to the first non-progressive resolution by alternately adjusting position of the progressive format of the third resolution up and down to make upper and lower fields, respectively, of the first resolution for display.

2. The method as recited in claim 1, further comprising the step of deinterlacing the non-progressive video signal to a progressive format having the first resolution.

3. The method as recited in claim 2, wherein the step of deinterlacing the non-progressive video signal includes employing a jagged diagonal reduction algorithm.

4. The method as recited in claim 2, wherein the step of downconverting includes the step of downsampling fields of the first resolution by a factor of four.

5. The method as recited in claim 4, wherein the step of downsampling includes sampling a first image i using a filter with a first phase and sampling an image i+1 using the same filter with a second phase.

6. The method as recited in claim 5, wherein fields are output from the filter with the first phase and the second phase and further comprising the step of combining the fields output from the filter of the first phase with the fields of the second phase to form non-progressive video of the third resolution.

7. The method as recited in claim 1, wherein the first resolution, second resolution and third resolution are associated with a vertical resolution.

8. The method as recited in claim 1, wherein the step of deinterlacing the video signal of the third resolution to form a progressive format video includes employing a jagged diagonal reduction algorithm.

9. A method for format conversion, comprising the steps of:
   providing a first interlaced video signal including non-progressive video of a first resolution;
   deinterlacing the non-progressive video signal to a progressive format having the first resolution;
   downconverting the progressive format of the first resolution to fields of a second resolution;
   combining and interlacing the fields at a third resolution;
   transmitting the video signal at the third resolution; and
   converting the progressive format video of the third resolution to the first non-progressive resolution by alternately adjusting position of the progressive format of the third resolution up and down to make upper and lower fields, respectively, for display.

10. The method as recited in claim 9, wherein the step of downconverting includes the step of downsampling fields of the first resolution by a factor of four.

11. The method as recited in claim 10, wherein the step of downsampling includes sampling a first image i using a filter with a first phase and sampling an image i+1 using the same filter with a second phase.

12. The method as recited in claim 11, wherein fields are output from the filter with the first phase and the second phase and further comprising the step of combining the fields output from the filter with the first phase with the fields of the second phase to achieve the third resolution.

13. The method as recited in claim 9, wherein the first resolution, second resolution and third resolution are associated with a vertical resolution.

14. The method as recited in claim 9, further comprising the step of deinterlacing the video signal of the third resolution to form a progressive format video.

15. The method as recited in claim 14, wherein the step of deinterlacing the video signal of the third resolution to form a progressive format video includes employing a jagged diagonal reduction algorithm.

16. The method as recited in claim 9, wherein the step of deinterlacing the non-progressive video signal to a progressive format having the first resolution includes employing a jagged diagonal reduction algorithm.

17. A system for format conversion, comprising:
   a conversion device which deinterlaces a non-progressive interlaced video signal having a first resolution to a progressive format having the same resolution, the conversion device downconverts the progressive format to a second resolution and combines and interlaces fields of the second resolution to provide frames at a third resolution;

a transmission link coupled to the conversion device for transmitting the video signal at the third resolution; and a reconversion device coupled to the transmission link, the reconversion device deinterlaces the video signal of the third resolution as a progressive format video and converts the progressive format video to alternating upper field lines and lower field lines for display.

18. The system as recited in claim 17, wherein the conversion device, which filters phases of pixels of the progressive format of the first resolution, includes a ¼, ½, ¼ filter.

19. The system as recited in claim 18, wherein the conversion device samples a first image i with a first phase and samples a second image i+1 using the same ¼, ½, ¼ filter with a second phase.

20. The system as recited in claim 19, wherein the fields are output from the ¼, ½, ¼ filter with the first phase and the second phase and further comprising combining means for combining the fields with the first phase with the fields of the second phase to achieve the third resolution.

21. The system as recited in claim 17, wherein the first resolution, second resolution and third resolution are associated with a vertical resolution.

22. The method as recited in claim 21, further comprising means for decimating pixels to reduce a horizontal resolution.

23. The system as recited in claim 17, wherein the reconversion device includes a jagged diagonal reduction algorithm for deinterlacing the video signal.

* * * * *